(12) United States Patent
Nicolov

(10) Patent No.: US 8,180,765 B2
(45) Date of Patent: May 15, 2012

(54) DEVICE AND METHOD FOR SELECTING AT LEAST ONE MEDIA FOR RECOMMENDATION TO A USER

(75) Inventor: Eugene Nicolov, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 458 days.

(21) Appl. No.: 12/484,774

(22) Filed: Jun. 15, 2009

(65) Prior Publication Data

US 2010/0318544 A1 Dec. 16, 2010

(51) Int. Cl.
*G06F 7/00* (2006.01)
*G06F 17/30* (2006.01)

(52) U.S. Cl. ........ 707/722; 707/736; 707/769; 707/805; 705/7.31

(58) Field of Classification Search .................. 707/759, 707/769, 770, 722, 736, 805; 705/7.31; 706/21
See application file for complete search history.

(56) References Cited

U.S. PATENT DOCUMENTS

| | | | |
|---|---|---|---|
| 6,662,231 B1 | 12/2003 | Drosset et al. | |
| 6,748,395 B1 | 6/2004 | Picker et al. | |
| 7,075,000 B2 | 7/2006 | Gang et al. | |
| 7,081,579 B2 | 7/2006 | Alcalde et al. | |
| 7,102,067 B2 | 9/2006 | Gang et al. | |
| 7,312,391 B2 | 12/2007 | Kaiser et al. | |
| 7,363,314 B2 | 4/2008 | Picker et al. | |
| 7,444,388 B1 | 10/2008 | Svendsen | |
| 2002/0178276 A1 | 11/2002 | McCartney et al. | |
| 2005/0256756 A1* | 11/2005 | Lam et al. | 705/10 |
| 2006/0247938 A1* | 11/2006 | Thieret | 705/1 |
| 2006/0254411 A1 | 11/2006 | Alcalde et al. | |
| 2008/0016205 A1 | 1/2008 | Svendsen | |
| 2008/0021851 A1 | 1/2008 | Alcalde et al. | |
| 2008/0134039 A1 | 6/2008 | Fischer et al. | |
| 2008/0139112 A1 | 6/2008 | Sampath et al. | |
| 2008/0140406 A1* | 6/2008 | Burazerovic et al. | 704/260 |
| 2008/0162503 A1* | 7/2008 | Narasimhan et al. | 707/100 |
| 2008/0256106 A1 | 10/2008 | Whitman | |
| 2008/0301240 A1 | 12/2008 | Svendsen | |
| 2009/0013004 A1 | 1/2009 | Manukyan et al. | |
| 2009/0069911 A1* | 3/2009 | Stefik | 700/94 |

(Continued)

OTHER PUBLICATIONS

Web site Pandora, http://www.pandora.com/people/, p. 1, downloaded Jun. 19, 2009.

(Continued)

*Primary Examiner* — Phong Nguyen
(74) *Attorney, Agent, or Firm* — David J Rahmer; Ericsson Canada Inc.

(57) ABSTRACT

The invention relates to a method and device for selecting at least one media for recommendation to a user. The device comprises an interface to a users database comprising data relative to users medias consumption and data relative to connections between users. The device further comprises a statistical analyzer receiving data relative to users medias consumption and connections between users in inputs and generating a first list of at least one media for output. The device comprises an interface to a medias library comprising parameters indicative of medias content. The device also comprises an analytical analyzer receiving data relative to users medias consumption and parameters indicative of medias content in inputs and generating a second list of at least one media for output. The device also comprises a recommendation engine receiving the first and second lists of media and selecting at least one media for recommendation to the user.

20 Claims, 11 Drawing Sheets

U.S. PATENT DOCUMENTS

2009/0083116 A1 *  3/2009  Svendsen ..................... 705/10
2009/0100469 A1 *  4/2009  Conradt et al. ............... 725/46
2009/0157795 A1 *  6/2009  Black .......................... 709/202

OTHER PUBLICATIONS

Web site Last, http://www.last.fm/, pp. 1-2, downloaded Jun. 19, 2009.

Web site Ilike, http://ilike.com/, pp. 1-2, downloaded Jun. 19, 2009.

Web site Amazon, http://www.amazon.com/, pp. 1-3, downloaded Jun. 19, 2009.

PCT Search Report from corresponding application PCT/IB2010/052595, Date: Oct. 2010.

* cited by examiner

DEVICE AND METHOD FOR SELECTING AT LEAST ONE MEDIA FOR RECOMMENDATION TO A USER

TECHNICAL FIELD

The present invention relates to the field of media recommendation and more particularly to a device and method for selecting at least one media for recommendation to a user.

BACKGROUND

Currently, there exist numerous systems for providing recommendations to an end user such as Pandora.com, Last.fm, iLike.com or Amazon.com. Amongst these systems and others, there are some for recommending media files, such as, for example music and video.

Several systems currently available utilize exclusively the usage patterns of the user as an input to the system and then try to infer and make predictions of the preferences or taste of the user in order to make a recommendation. In the case of music media, for example, the usage pattern of the user may be the actual listening of songs.

In most current systems, once the preferences or tastes of a user have been determined through his usage pattern or usage history, an external database containing media is queried with these preferences in order to provide a list, often called a playlist, to the user. Many systems of the prior art propose applying digital signal processing (DSP) techniques for inspecting the medias in order to extract media relating properties which can then be used for querying a database of available medias and matching a subset of medias to constitute a recommendation for the user.

Therefore, many systems of the prior art analyze the usage history of the user, and attempt to discover or characterize the tastes of a user with DSP techniques. However, these systems have shortcomings as it is difficult to characterize media tastes of human beings and how these tastes relate to the properties of media files.

Furthermore, many systems of the prior art use a pre-analyzed and central database of media having a limited scope and size which limit the recommendations that can be provided to a user, since no single database can be maintained to contain all the medias ever produced.

SUMMARY

It is therefore a general object of this invention to provide a device and method for overcoming at least some of the prior art drawbacks.

According to an aspect of the invention, a device for selecting at least one media for recommendation to a user is provided. The device comprises an interface to at least one users database comprising data relative to users medias consumption and data relative to connections between users. The device further comprises a statistical analyzer receiving at least some of the data relative to users medias consumption and at least some of the connections between users in inputs and generating a first list of at least one media for output. The device comprises an interface to at least one medias library comprising parameters indicative of medias content. The device also comprises an analytical analyzer receiving at least some of the data relative to users medias consumption and at least some of the parameters indicative of medias content in inputs and generating a second list of at least one media for output. The device also comprises a recommendation engine receiving the first and second lists of at least one media in inputs and selecting at least one media for recommendation to the user for output.

According to another aspect of the invention, a method, executed in a server, for selecting at least one media for recommendation to a user is provided. The method comprises the steps of accessing at least one users database to retrieve data relative to users medias consumption and to connections between users, analyzing at least some of the data relative to users medias consumption in combination with at least some of the connections between users and generating a first list of at least one media. The method comprises accessing at least one medias library to retrieve parameters indicative of medias content, analyzing at least some of the data relative to users medias consumption in combination with at least some of the parameters indicative of medias content and generating a second list of at least one media. The method further comprises selecting based on the first and second lists of at least one media at least one media for recommendation to the user.

BRIEF DESCRIPTION OF THE DRAWINGS

The objects and advantages of the invention will be understood by reading the detailed description in conjunction with the figures, wherein.

DETAILED DESCRIPTION

Figure 1:
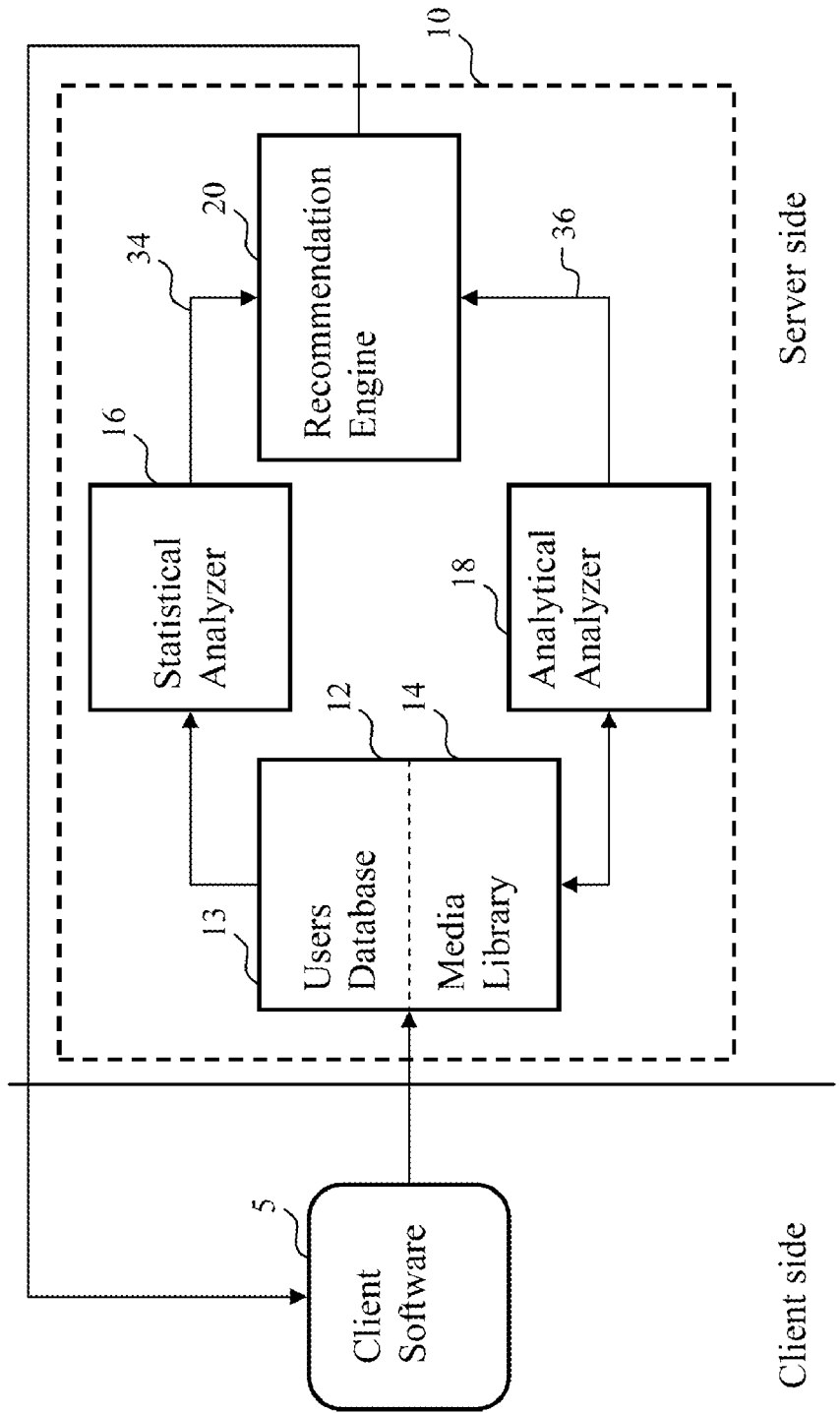
FIG. 1 is a block diagram of components of a system, including a device in communication with a client software, according to an exemplary embodiment of the invention.
Figure 2:
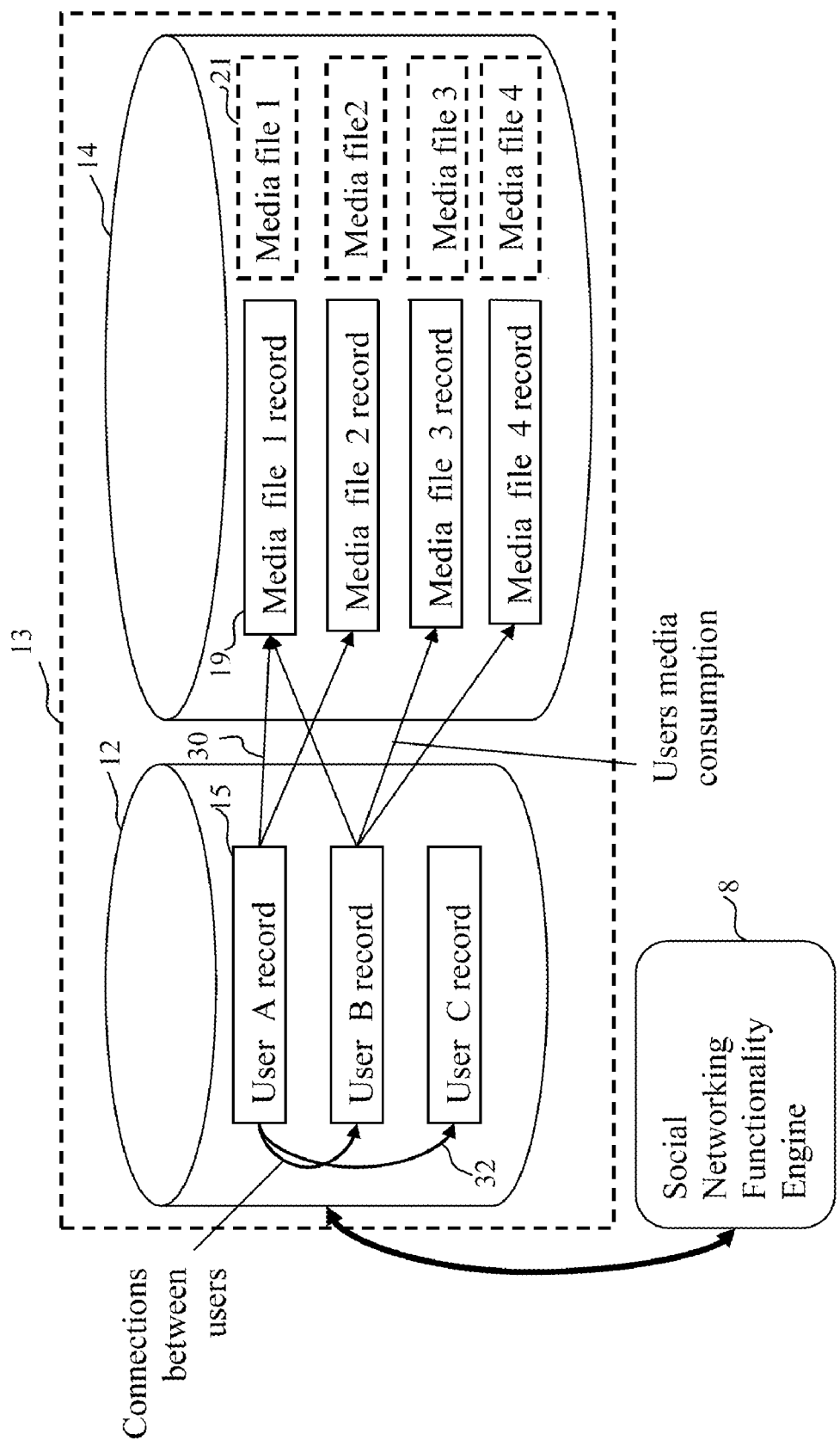
FIG. 2 is a block diagram of a users database and media library according to an exemplary embodiment of the invention.

The various features of the invention will now be described with reference to the figures. These various aspects are described hereafter in greater detail in connection with an exemplary embodiment and examples to facilitate an understanding of the invention, but should not be construed as limited to this embodiment. Rather, this embodiment is provided so that the disclosure will be thorough and complete, and will fully convey the scope of the invention to those skilled in the art.

The embodiment according to the present invention is described with reference to block diagrams and/or operational illustrations of methods, servers, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Thus, the various aspects of the invention may be embodied in many different forms, and all such forms are contemplated to be within the scope of the invention. The computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Furthermore, in some illustrations, some blocks may be optional and may or may not be executed; these are generally illustrated with dashed lines.

The premise of many recommendation engines of the prior art is to help a user discover new media, but current solutions aim at fulfilling the reduced scope of making the user discover something new but similar to what he already likes. This does not take into account that the tastes of a user can be extremely general, complex and evolving. Current recommendation engines try to establish the tastes of a single user and do not try to determine the tastes of a group in order to make a recommendation.

This document presents the principles of a Social Network Group-Based Media Content Recommendation Engine. This recommendation engine utilizes as input the media usage pattern of an entire social group, instead of just the usage pattern of a single user, for making media recommendations. Furthermore, the usage pool of the social group is used as a source of media recommendations. The system has several possible and configurable modes of functioning. Finally, this invention may apply, but not exclusively, to mobile phones with media players, such that the social network used may be built automatically from the contacts information available in the mobile phones or may be independent of the contacts of the mobile phone.

Reference is now being made to FIGS. 1 to 5, where FIG. 1 shows a system 1 comprising a client side and a server side. The client side comprises a client software 5, preferably running on a client device, such as a user device, for example a cell phone, computer or any equivalent user device. The server side comprises a device 10 for selecting at least one media for recommendation to a user is illustrated. In this exemplary embodiment, the device 10 is illustrated as being on the server side, but is has to be understood that at lease some of its components could be on the client side. Furthermore, in some embodiments, the server side could be entirely comprised on the client side. The server side may be executed in a server, a general user computer or any equivalent device. The device 10 has an interface to at least one users database 12 comprising data relative to users 15 medias consumption 30 and to data relative to connections between users 32. The connections between the users are represented by arrows 32 on FIG. 2. These connections may represent relations between users, such as being "friend", "married", "coworkers", etc. It should be understood that the system may have access to as few as one database 12 and to as many databases 12 as necessary. These databases being distributed among a network of devices, including other devices, or grouped in one or a plurality of servers. The expression "interface to the database" is intended to cover the case where the device 10 itself contains a database 12. The database may contain more than one type of information. The database 12 may record the social networking connections 32 between all the users. The database 12 may also keep track of the media usage history or media consumption 30 for every user 15. The usage pattern or history may include information such as media download information and media playing statistics.

The device 10 further has a statistical analyzer 16 receiving at least some of the data relative to users medias consumption 30 and at least some of the connections 32 between users 15 in inputs and generating a first list of at least one media for output 34. The device 10 utilizes and considers the behavior of an entire group of people, such as the social network of the user or a subset of this social network, in order to generate recommendations. The statistical analyzer 16 receives its data from the database 12. A software system may perform statistical analysis of the entire usage history of a group of users, in order to detect trends of media usage within this group. This usage trend may then be used for generating the first list of at least one media for output 34.

The device 10 also has an interface to at least one medias library 14 comprising parameters indicative of medias content 19. The users database 12 and the medias library 14 may be comprised in the same 13 or in different entities 12, 14. Therefore, the medias library 14 may be comprised in the users database 12 or vice versa. Any number of databases 12 or media libraries 14 may be accessed by the device 10 and the databases and libraries may be local to the server or distributed in a network. The at least one medias library 14 may further comprise medias content 21. The media content 21 could also be contained in separate libraries 23 accessible by the system 1. Further data attributes may also be stored in the users database 12 or the medias library 14, such as user provided media ratings, deletion information and other user media manipulation information.

The device 10 also comprises an analytical analyzer 18 receiving at least some of the data relative to users 15 medias consumption 30 and at least some of the parameters indicative of medias content 19 in inputs and generating a second list of at least one media for output 36. The analytical analyzer 18 analyzes the users media consumption pattern 30 algorithmically in order to determine a set of attributes describing the users media preferences. This analytical analyzer 18 may also optionally perform algorithmic analysis via a content analyzer 25, described below, on the media recommendation set provided by the statistical analyzer 16 and match these attributes to those representing the users tastes in order to further reduce the candidates for media recommendation.

The device 10 may also comprise a content analyzer 25 receiving at least one of the medias content 21 as input and generating corresponding parameters indicative of the at least one medias content for output. The content analyzer 25 may be comprised within the analytical analyzer 18 and may use a Digital Signal Processing (DSP) technique or other techniques of the like to generate the corresponding parameters indicative of the at least one medias content.

Figure 3:
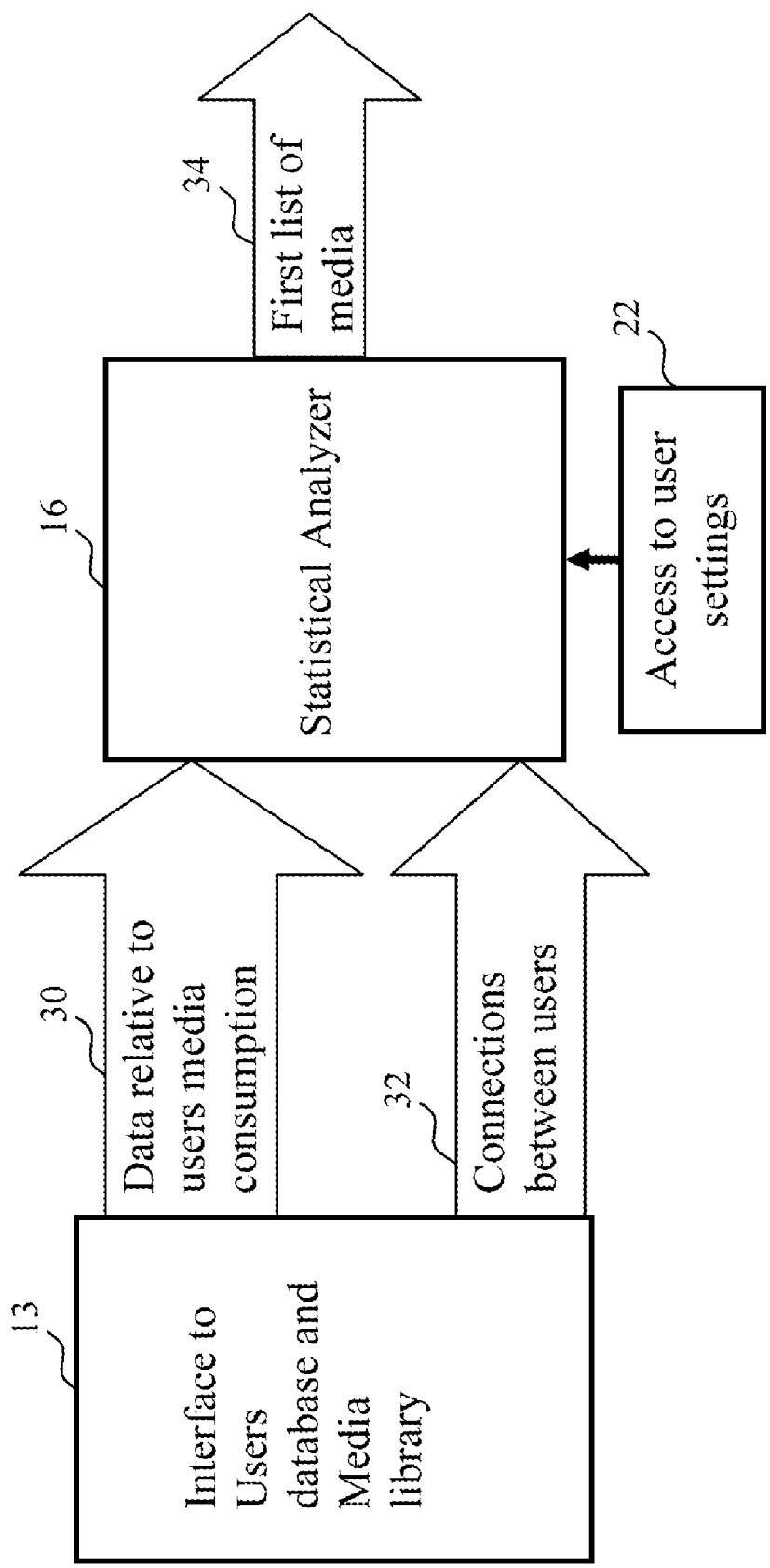
FIG. 3 is a block diagram of a subset of the components of FIG. 1 further illustrating statistical analyzer.
Figure 4:
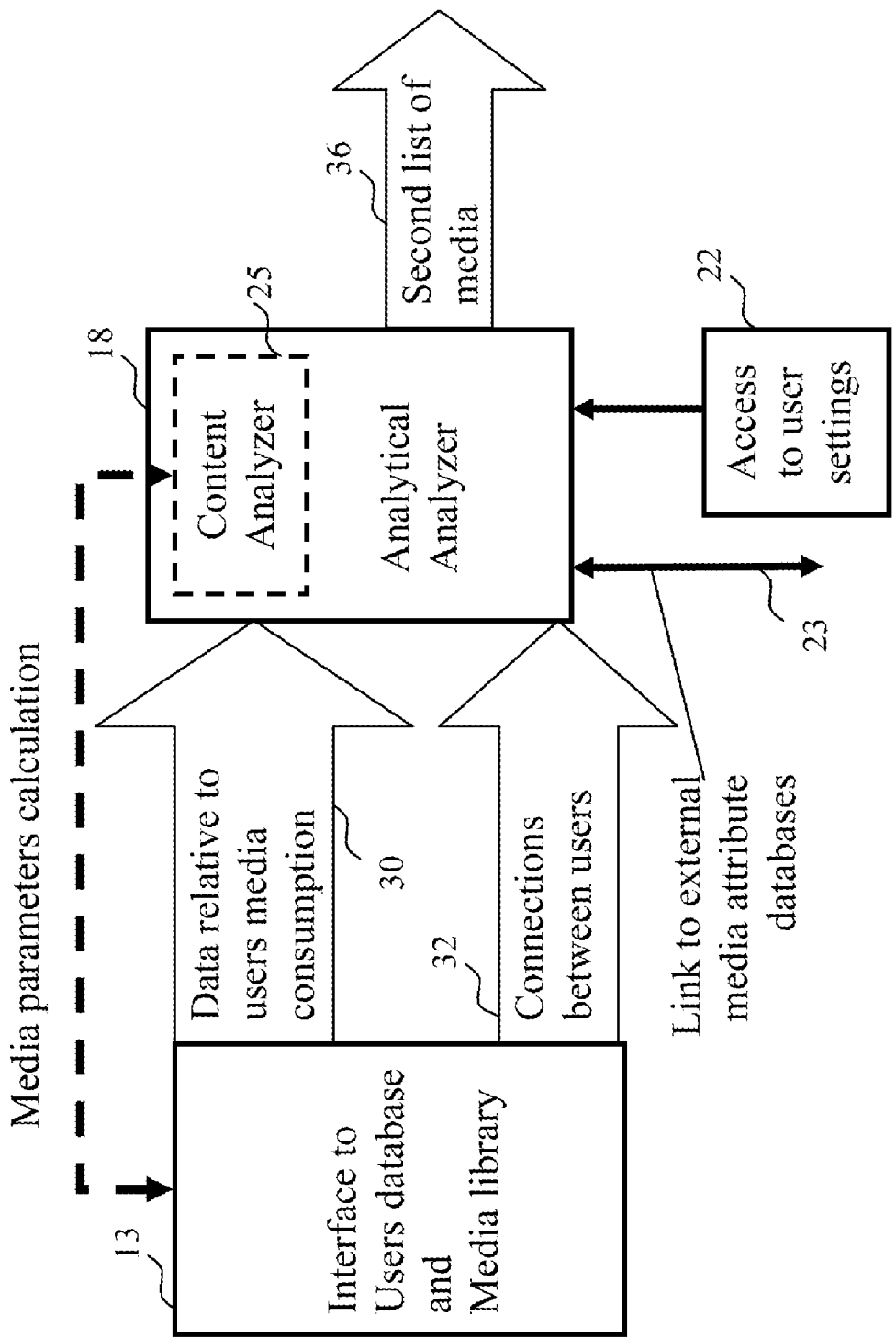
FIG. 4 is a block diagram of a subset of the components of FIG. 1 further illustrating the analytical analyzer.
Figure 5:
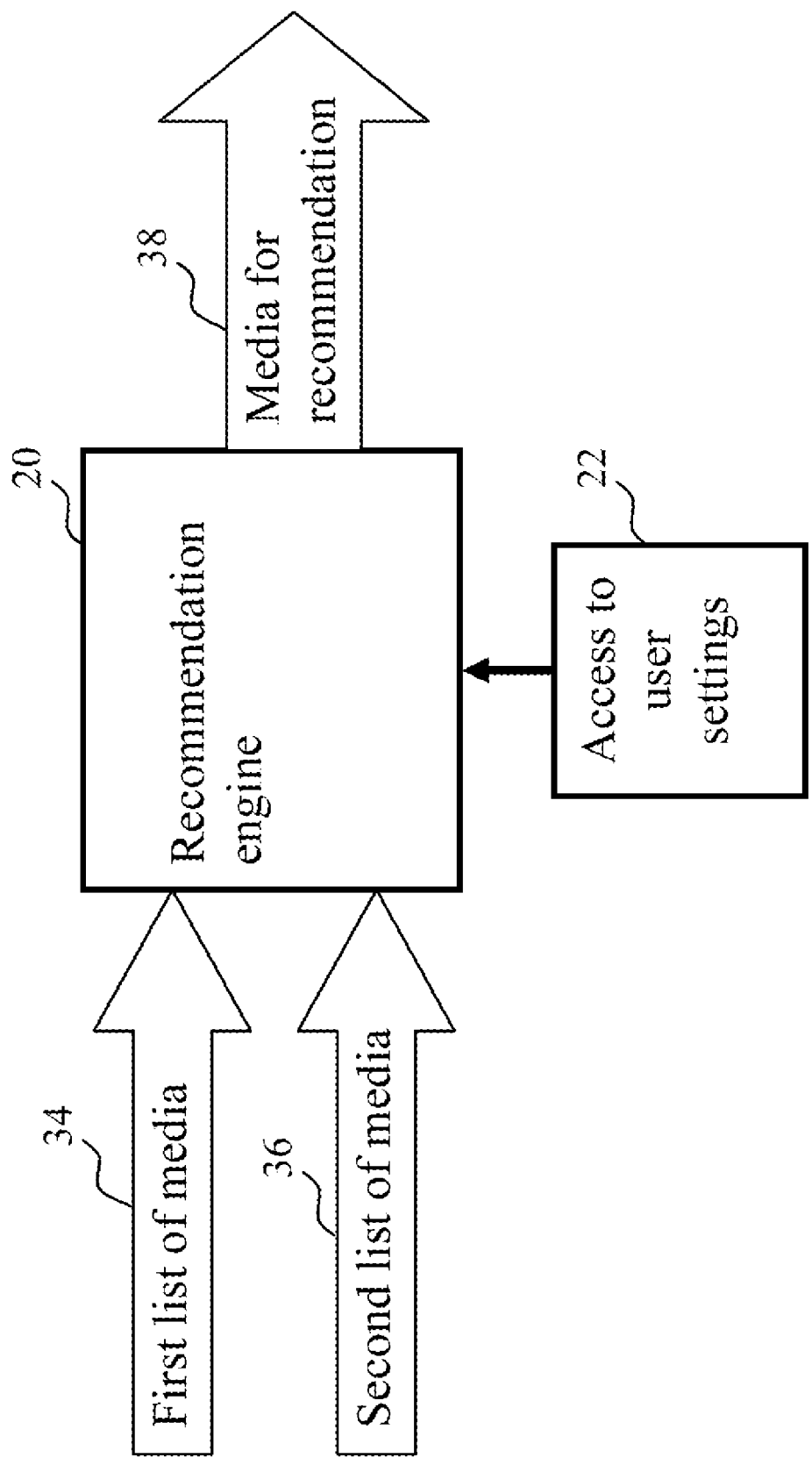
FIG. 5 is a block diagram of a subset of the components of FIG. 1 further illustrating the recommendation engine.

The device 10 also has a recommendation engine 20 receiving the first and second lists 24, 36 of at least one media in inputs and selecting at least one media for recommendation for output. The recommendation engine 20 combines the results of both the statistical analyzer 16 and the analytical analyzer 18 and based on these results as well as based on user settings 22, as illustrated in FIG. 3-5, provided by the user, it may generate recommendations to the user.

Finally, a client software 5 may be installed on a user device, such as a mobile phone, or any other device, on which users consume media. This client software 5 may have the task to communication the user media consumption 30 or usage history to the users database 12 and the media library 14. Furthermore, the client software 5 may have the task to communicating media for recommendations 38 to the user. The client software 5 could be implemented as a plug-in to popular media players, such as iTune® or Media Player®, or it could be integrated directly into the user device.

The users database 12 and medias library 14 may be contained in a centralized users database and medias library 13 (or in many databases and libraries) with all information needed to be stored permanently. This users database and medias library 13 may also be included in a module further containing every functionality needed for processing its data.

The user database 12 may contain entries for all the users in the system 1. It may furthermore contain references 32 from one user 15 to other users 15. These links 32 may correspond to the contacts that the user has in the social network and may be built from the address book of a cell phone, for example. Furthermore, the user database 12 may, again through references 30, keep track of which media is consumed by which user, as well as the number of times each media is consumed. This statistical information may be used in order to generate recommendations.

The media library 14 may further contain entries for all the media consumed by all the users of the system 1. These entries may also contain all attributes of the media that may also be used for generating recommendations. These attributes can be, but are not limited to, human generated attributes, such as media style, as well as algorithmically generated ones, such as DSP calculated musical attributes for music media. These attributes may be generated by the content analyzer 25.

Each time a user consumes a certain media, such as a song for example, the user entry of the user database 12 may be updated with a reference 30 pointing to the entry of the media in the media library 14, for example. If the media does not yet have an entry in the database, such as if it is the first time anyone in the system 1 listens to a certain song, an entry may be created for the media in the media library 14. Thereafter, when another user consumes the same media, a counter in the database tied to a reference 30 between the particular user and the particular media may be incremented in order to keep statistics on the usage history. The counter entry may further keep track of the time period at which the media was consumed, for example, the time of day, the day of year, etc.

The organization of the various data stored in the user database 12 and media library 14 may be divided in four general data sets: User Data 15, User-to-User References 32, e.g. references between a user and other users, Media Data 19 and User-to-Media References 30, e.g. reference between users and media. Each of these general data sets may be stored as entries in a set of database tables. Below is a non limitative example of the type of information that these four general data sets might contain:

1. User Data 15:
   a. User name and other credentials;
   b. User-controlled system settings, security settings;
   c. Media preferences information;
   d. System usage information;
   e. Any other data that is relevant to a particular user;
2. User-to-User References 32:
   a. Entry linking one user to another (used for defining social-network links, from which social network graphs and groups can be built);
   b. Information describing the links between users (such as, but not limited to, date, which user initiated the link, social group name to be used for the link, etc.);
   c. Any other data relevant to the user-to-user reference;
3. Media Data 19:
   a. Identification data for the media (such as, but not limited to, title, author, compositor, year, album, actors, writers, etc.);
   b. Digital fingerprint, digital signature, or any other DSP data that can be used to identify a media from its actual digital content;
   c. Extra attributes that could be useful to the system (such as, but not limited to, song genre, song style, style classification information, etc.);
   d. Any other data that is relevant to a particular media data;
4. User-to-Media References 30:
   a. Entry linking one user to one consumed media data (used for extracting statistical media-usage data);
   b. Information describing the link between the user and the consumed media date (such as, but not limited to, time and date on which the data was consumed, device on which the data was consumed, whether the media data was downloaded by the user or not, etc.);
   c. Any other data that is relevant to the user-to-media reference.

The device 10 or the combination of users database and medias library 13 may further comprise a social networking functionality engine 8. This engine 8 may also include functionality to deal with all the social-networking aspects. For example, its functionalities may include a service for dealing with "friends requests", that is when a user requests to add another user in one or many of his social network groups. This functionality may relay the friend request to the destination user, and may relay the response of the destination user back to the originating user. If the request is approved, a reference 32 from the originating user to the destination user may be added in the user database 12.

All other social-networking aspects may also be served by the engine 8, such as removing users from the social network of a user, changing group names, removing groups, etc. Furthermore, this engine may also be able to provide a list of users that are part of a certain social-networking group. This list of users may be built by analyzing a social networking graph data that is provided by the user-to-user reference data 32.

The user database 12 and the medias library 14 may also provide functionality for open groups. An open group is a special kind of social network group which may be opened for anyone to join. Such a group may be configured in a way that only a certain number of its members generate recommendations for all the members. For example, a popular music band could create an open group, free for anyone to join and such that the fans of the band would be informed of the musical tastes of the band members. An open group may also be configured in a way that all its members generate recommendations for the whole group. For example, a theme-based open group may allow for people that do not personally know each other to receive recommendation from other like-minded individuals.

Referring now more particularly to FIG. 3 to 5 each component of the device 10 will be described in more details. FIG. 3 shows the statistical analyzer 16 which analyzes the information contained in the user database 12 and in the medias library 14 in order to generate a first list of media 34 as an initial set of potential media recommendations. The statistical analyzer 16 may calculate statistical data and generate popularity ratings of media based on consumption frequency. These popularity ratings, may be computed per group, that is, they may be specific and different for every social group in the network. To calculate the popularity rating, the statistical analyzer 16 may need to retrieve, from the users database 12 and the media library 14, the user data 15 of the user which is to receive a media recommendation. The statistical analyzer 16 may also need to retrieve the group definition, that is, the list of all the users that are part of the social-networking group of the user. The statistical analyzer 16 may further need to retrieve the user-to-media reference data 30, analyzed in order to retrieve the media-consumption frequency for users in the social-networking groups of the target user, as well as for retrieving the media consumption of the target user. The popularity rating for a media may be calculated using the consumption frequency of the media as well as the date information about when the consumptions occurred. Both these information can be retrieved from the users database 12 and the media library 14. Other variables and factors could also be used, such as data indicative of how the media was purchased or how the media was retrieved from a personal collection.

The statistical analyzer 16 may also include per user normalization operations, such that a single user that consumes a very large number of medias does not influence the statistical model in a disproportionate way only because of his higher medias consumption rate. However, this normalization operation may take into account the fact that a user that consumes a large number of medias can also consume a single media at a high frequency. Such a media may then still have a higher popularity weight.

The statistical analyzer 16 is supplied with inputs from the users database 12. The first information used as input is the data relative to users connections 32 or group definition, that is, a listing of the users that are part of the social network group of the user. The second information is the raw users data consumption 30 or data of all the media consumption frequency of the members of this social network group. Other inputs can also be retrieved from the user database 12 or medias library 14 as necessary. For example, information concerning if a particular media was bought online, downloaded for free or originated from the collection of a user may be inputted to the statistical analyzer 16.

The statistical analyzer 16 may then apply a mathematical formula on the supplied inputs 30, 32 in order to generate a statistical ordering of the media files consumed by the social network group of interest. An exemplary formula which may be used by the statistical analyzer 16 is shown below, where P(t) is the popularity factor of the media as a function of time, α is a sliding time-windowing factor, K is the number of users in the social group, η is the per-user normalizing factor and F(t) is the frequency in time of the media's usage. Furthermore, N is the total number of complementary data, other than the usage frequency, that may be used in determining the popularity of the medias, w is the weight of each of these complementary data and c is the constant popularity value associated to each of these complementary data.

$$P(t) = \alpha(t) \sum_{k=0}^{k=K} \eta_k F_k(t) + \sum_{n=0}^{n=N} w_{c_n} c_n$$

Using the above formula, the statistical analyzer 16 may assign a popularity factor to each media consumed by each member of the social-network group and may then order these media using this popularity factor. This ordering could either be from the most popular to the least popular, or the opposite, from the least popular to the most popular. This choice may be decided by a user setting 22. Assuming that a user has chosen the user setting that would recommend him the most popular songs, the media files would be ordered from highest popularity factor to the lowest, and then high ranked medias that are not present in the library of the target user would be chosen as potential recommendations.

Referring more specifically to FIG. 4, the analytical analyzer 18 analyzes the actual digital content of the media, as well as any tags or other meta information available that describe the media, and produce another set of potential media suggestions. The analytical analyzer 18 may apply any number of standard Digital Signal Processing (DSP) techniques on the actual content of a media file, through the use of the content analyzer 35. The resulting data may be stored as parameters indicative of the media content in the media library 14.

The analytical analyzer 18 may also retrieve any meta data available encoded in the actual digital media file and also store it as parameters indicative of the media content in the medias library 14. The analytical analyzer 18 may also have the ability to query external databases 23 in order to retrieve information about the media files it is analyzing. In the event that media is not yet in the media library 14, or is not identifiable, the analytical analyzer 18 may obtain a digital copy of the media from another media library (not shown) of from a client software 5 installed on the media player of the user, for example, to analyze the media. The parameters indicative of the media file content may be preserved in the medias library 14.

The analytical analyzer 18 may also, though artificial intelligence (AI) methods, attempt to determine information that it does not hold; for example it could attempt to determine the genre of song through the use of a set of musical markers. The methods used for analyzing media can also be modified, added or removed on the fly while the system is operating.

The analytical analyzer 18 is supplied with input from the users database 12 or the medias library 14. Information used as input comprise the user data of the user and data relative to users connections 32 or group definition, that is, a listing of the users that are part of a particular social network group of the user may also be used. Another information is the user-to-media reference data 30 or user media consumption 30, analyzed in order to retrieve the list of media files consumed by the social-networking group of the target user, as well as for retrieving the media consumption of the target user. The analytical analyzer 18 is also supplied with the media data (not shown) which is analyzed in order to retrieve the attributes, parameters, tags, meta data, DSP information, or any other information need in order to make its analysis and propose a second list of media 36 for potential recommendations.

The analytical analyzer 18, may use any of the previously described inputs and apply an attribute matching algorithm, which may order the media files consumed by the entire group according to the level to which they match the attributes of the media consumed only by the user of interest. This ordering may provide a list of media files consumed by the social-network group and that have the highest level of matching with the attributes of the media files consumed by the target user. In plain words, the ordered media files may correspond to media taken from the entire group but that the target user may find to his taste or liking.

To create a set of possible media recommendations, the analytical analyzer 18 may then select media files that are in this ordered list, which are susceptible to be liked by the target user, but that have not been consumed by the target user or are not part of media library of the target user.

The analytical analyzer 18 may then proceed with attribute and parameter matching which may work on two different levels. Firstly textual meta attributes matching may be done, for example, in the case of music, matching of "author" attributes, "style" attributes, "genre" attributes, "date" attributes, etc. may be done. Secondly DSP matching of attributes or parameters indicative of media content may be done, for example, in the case of music, matching attributes such as timbre, tempo, melodies, pitch or rhythm. A person skilled in the art would readily recognize that many additional meta attributes and parameters indicative of media content could be used. Every attributes and parameters known in the art should be considered to be included herein.

To illustrate a possible functioning of the textual meta/tags attributes matching, again for the case of music media, the system 1 could analyze the media consumption of the desired user and that of the entire social-group from which the recommendations are to be made. Thereafter, a match between attributes such as "author" like "Mozart" could be made if the target user often listens to music of Mozart. In the social-network group, it could be detected that other users having the attribute "Mozart" listen to music by "Mozart", but also listen to music of "Chopin" and, for example, do not do not listen to music by "Metallica". Therefore, media files that match the "author" attribute "Chopin" could be used as media suggestions for the target user. Furthermore, media files that match the "author" attribute "Metallica" would not be used as media suggestions for the target user. The usage of such a textual meta attribute matching algorithm may be extended and modified as much as desired, on the fly, as the system 1 is functioning. The complexity is in determining the possible relations between meta values, as for example determining that music media tagged with the meta attribute "classical music" also relate to music media tagged with the meta attribute "chamber music", "chamber music" being a form of "classical music". The possible relations could be indicated to the system 1 either through human intervention or though automated machine learning. Once again, these relations may be updated as the system 1 is functioning.

To illustrate a possible functioning of a DSP attributes matching algorithm, again for the case of music media, the system 1 may analyze the media consumption of the desired user and that of the entire social-group from which the recommendations are to be made, and match the following parameters. First, it can be determined that the target user often listens to likes songs that have a certain value for the "timbre" coefficient, which can be estimated using, for example, the Mel-Frequency Cepstrum. Other users from the social-network group may also listen to songs that have a similar value for the "timbre" coefficient, but the target user does not have these songs in his media library. These songs could be used as recommendations for the target user. An implementation of the device 10 could use a number of different DSP techniques for extracting information about the digital media and performing matching on this information. The DSP techniques used may further be modified as the system is functioning.

The analytical analyzer 18, has either user-controlled settings or internal administrative settings which may determine which textual meta attributes and DSP parameters to use when performing matching. The analytical analyzer 18 may further be seen as a "user centric" module, because it attempts to match the behavior of a single user to that of the whole group, whereas the statistical analyzer 16 may be seen as a "group centric" module because it is concerned with studying the statistical behavior of the entire group.

The analytical analyzer 18 may also comprise a content analyzer 25 for servicing another optional purpose of the device 10, which is to analyze, with a set of various DSP techniques and other algorithms, all new media files that need to be recorded in the medias library 14. The content analyzer 25 may be triggered when a user consumes a media file for which there is not a match yet in the medias library 14.

Finally, the analytical analyzer 18 may have a link to a number of external media databases (not shown), in the case some extra parameters about the media, not natively available to the system 1, need to be extracted and used for the parameters matching algorithm.

Now referring to FIG. 5, the recommendation engine 20 may combine results from both the statistical 16 and analytical analyzers 18 (lists 34, 36) and then, by using the user settings 22 provided by each user, may issue recommendations to the user. It has to be understood that the user settings 22 may be different for each user of the system 1 and that therefore, given the same information and data, two users could obtain two different recommendations if they have different user settings 22. The recommendation engine 20 may be more or less controlled by the user settings 22 that the user has provided for its operation in general. These user setting 22 may contain settings for a large number of controllable entries, such as for example, the weight of the statistical analyzer's 16 result list 34 in the decision, which could be an atomic value, such as high or low, or a sliding integer scale. Another entry may be a choice between sorting from the most popular songs, or the least popular songs, which could also be an atomic value or a sliding spectrum of popularities. The weight of the analytical analyzer's result list 36 may be another entry in the decision, this weight could be an atomic value, such as high or low, or a sliding integer scale. A randomness level which could be an atomic value, such as high or low, or a sliding numerical scale could also be applied. Privacy settings could also be used as an entry. These user settings 22 form a minimum set of available controllable settings. However, other implementations of the device 10 should not be limited to these entries. Furthermore, some of the user settings 22 described above could be disabled or set to default values, such that the end user may not have control over them.

The different user settings 22 may influence the functioning of the recommendation engine 20 in different ways. The weight applied to the statistical analyzer's 16 result list 34, for example may determine the weight given to the output from the statistical analyzer 16 in the final recommendation decision taken by the recommendation engine 20. This weight may be controlled either by atomic values, such as high or low, or by a sliding scale of values such as a numerical values range. If this weight is set to the lowest possible value, then the output result list 34 from the statistical analyzer 16 may have a minimal impact on the recommendation engine 20 when generating recommendations.

The choice between the most popular songs, or the least popular songs may determine the mode of functioning of the statistical analyzer 16. It may allow the user to decide if he is interested in getting recommendations from the least frequently consumed media with a low popularity factor or from the most frequently consumed media with a high popularity factor. This factor may be controlled either by an atomic value, such as most popular or least popular or by a sliding scale of values with an integer values range.

The weight applied to the analytical analyzer's 18 result list 36 in the decision may determine the weight given to the output result list 36 from the analytical analyzer 18 in the final recommendation decision taken by the recommendation engine 20. This weight may be controlled either by an atomic value, such as high or low, or by a sliding scale of values with an integer values range. If this weight is set to the lowest possible value, then the output result list 36 from the analytical analyzer 18 may have a minimal impact on the recommendation engine 20 when generating recommendations.

An option to use more or less or not at all the different media parameters available may allow for the user to determine if any extra tags or meta information about the media files may be used by the analytical analyzer 18. This setting could be further narrowed in order to indicate exactly which kind of tags, meta information or parameters should or should not be used by the analytical analyzer 18. For example, this setting should allow the user to specify that he wants the music genre, in the music media case, to be an attribute considered by the analytical analyzer 18.

The randomness level may introduce an element of randomness in the decisions made by the recommendation engine 20, while the privacy settings may control the level of privacy the user enjoys in the different social network groups that he is part of. An element of privacy may be the decision to either allow a user's contact id to be associated or not with a media recommendation that other users in the group may receive. There could be other privacy mechanisms or levels controlled by this setting. In the end, the recommendation engine 20 receives as input the result lists 34 and 36 respectively from the statistical 16 and the analytical analyzers 18. Based on these inputs 34 and 36 and on the user settings 22, the recommendation engine 20 generates a list of media files that can be used as recommendations 38 for the end user.

Figure 6:
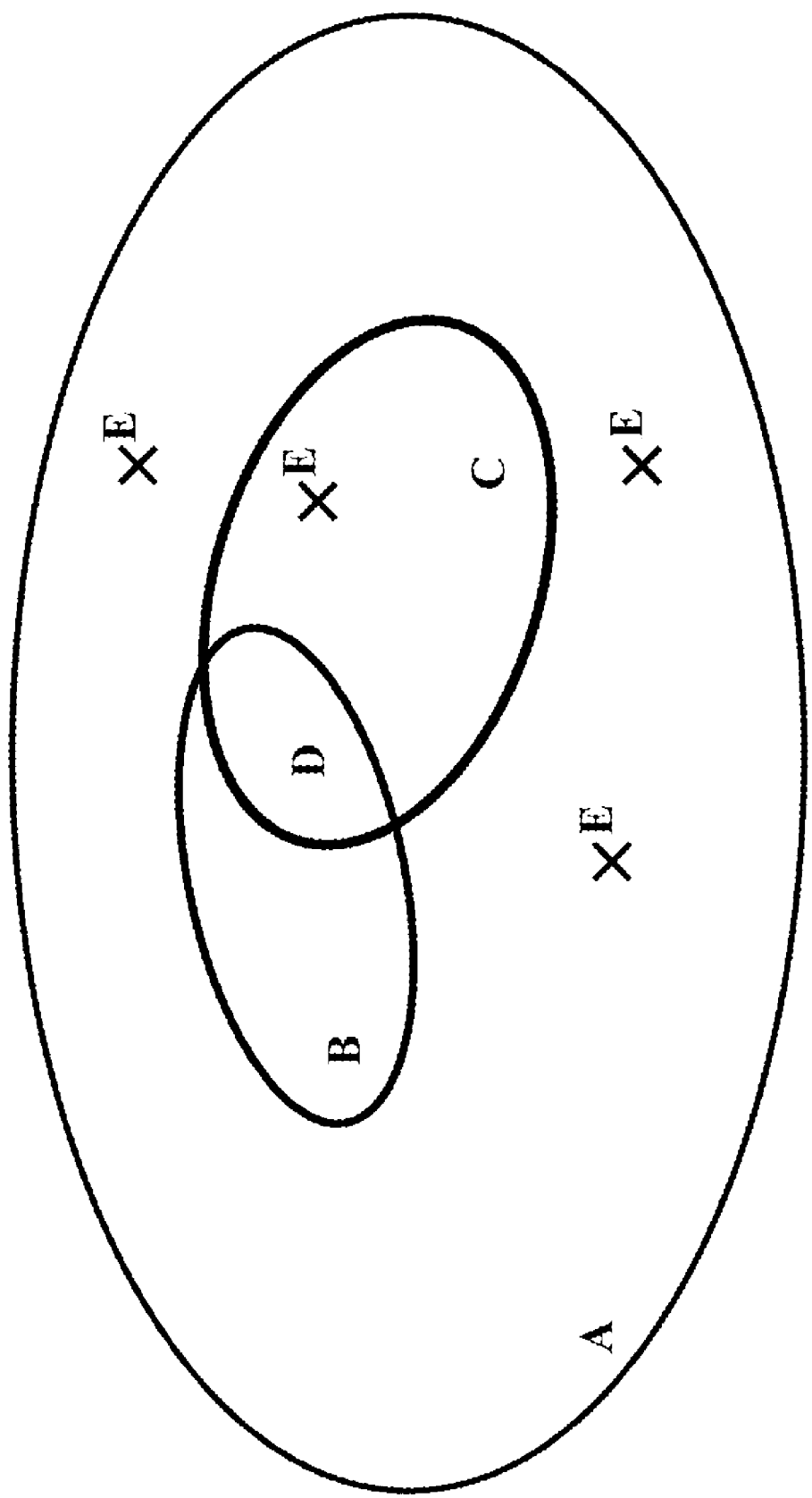
FIG. 6 is a graph illustrating subsets of media available for selection and recommendation.

FIG. 6 illustrates the process of making a recommendation decision by the recommendation engine 20. On the diagram of FIG. 6, the area A represents the set of all the media files consumed by a group to which the user is part. Area B represents a sub-set of A, generated by the statistical analyzer 16, of statistically ordered media files, corresponding to the first list of media 34. The ordering method, for example from more popular to less popular, or from less popular to more popular, is decided by a user setting. Area C represents the sub-set of area A, generated by the analytical analyzer 18, of parameter ordered media files, corresponding to the second list of media 36. The ordering method and which parameters are used for ordering and which are not, are decided according to the user setting. This diagram is used only for explanatory purposes. It is assumed that the size of sets B and C can be as large as the set A. Set D is the interception of sets B and C. Points E are random media files that can be selected anywhere from set A, and thus from sets B, C or D. The selection of random media files is triggered by a randomness user setting 22.

If the user settings 22 are such that the user wishes to use predominantly the statistical analyzer's 16 result list 34, then the recommendation engine 20 may select most medias from set B. If the user settings 22 are such that the user wishes to use predominantly the analytical analyzer's 18 result list 36, then the recommendation engine 20 may select most medias from set C. If the user settings 22 are such that the user wishes to use both the outputs 34 and 36 from the statistical 16 and analytical 18 analyzers in similar proportions, then the recommendation engine 20 may select medias from set D. According to the user settings 22 used, set D may have a changing size and may select a larger subset of B or a larger subset of C. Furthermore, the subsets of both B and C selected by set D may grow as the magnitude of the different user settings 22 grows. Finally, media files represented by E are selected as per the level of the randomness user setting 22. The smaller the value of the randomness user-setting, the closer the media selection subset may be to the recommendation set determined by the recommendation engine 20, down to a level where the results are the same as if the randomness user setting had not been activated. The larger the value of the randomness user-setting, the larger the parent set of random picks is, such that these picks could be further from the recommendation set determined by the recommendation engine 20.

Figure 7:
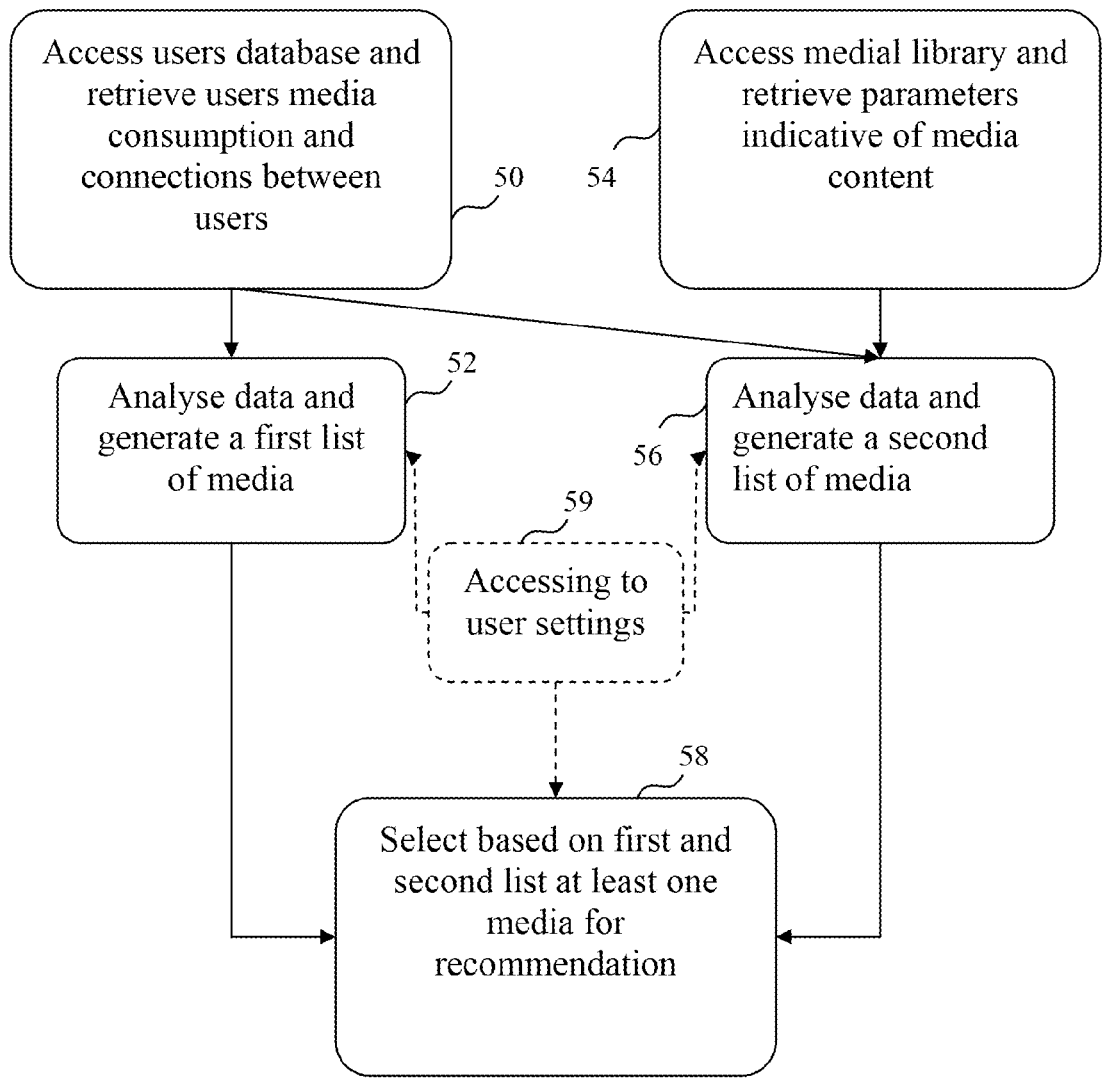
FIG. 7 is a flowchart illustrating an exemplary method according to the invention.
Figure 8:
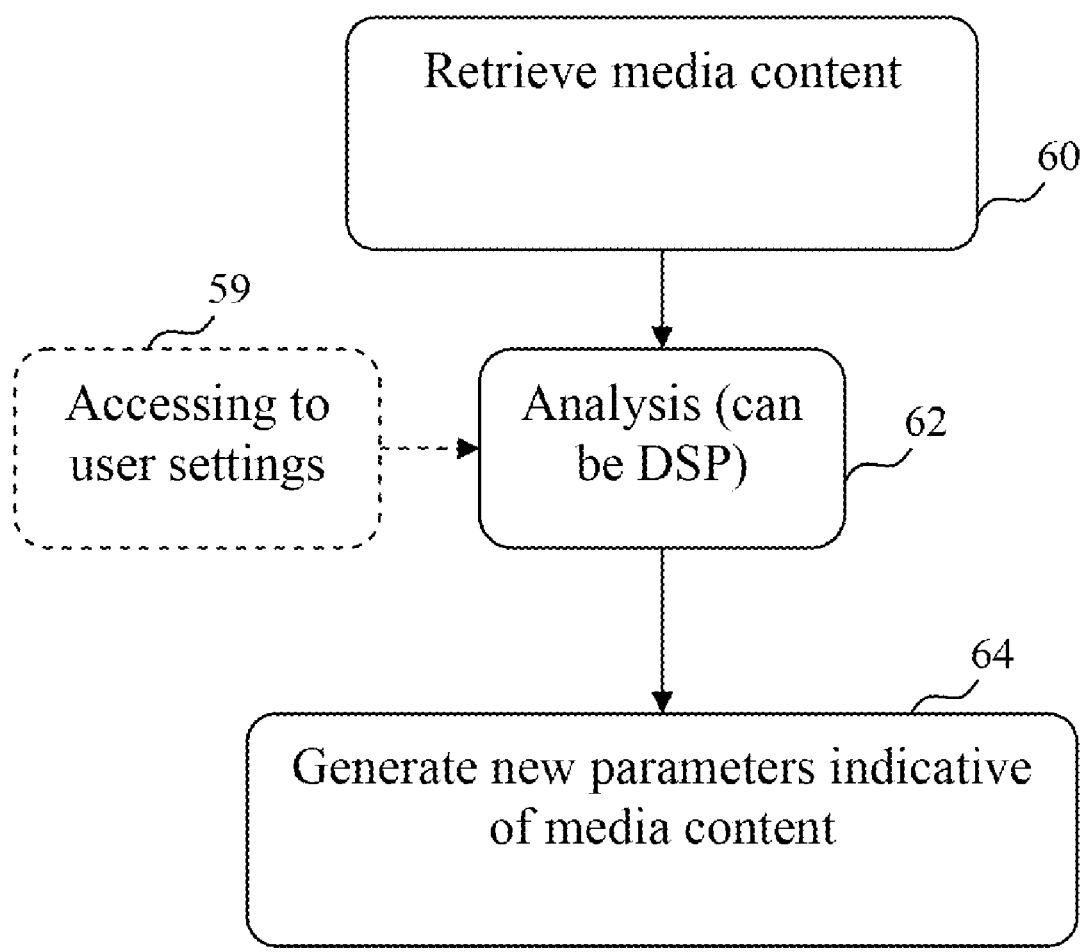
FIGS. 8-11 are flowcharts illustrating additional steps to the method of FIG. 7.

The device 10 may be a part of a server, centralized in the network and may perform the server side functionality of a larger system. As illustrated in FIGS. 8 to 11 in order to generate recommendations to the user, a server executes a method which comprises the following steps. The method comprises accessing to at least one users database, step 50, to retrieve data relative to users medias consumption and to connections between users. The method also comprises analyzing at least some of the data, step 52, relative to users medias consumption in combination with at least some of the connections between users and generating 52 a first list of at least one media. The method comprises accessing to at least one medias library, step 54, to retrieve parameters indicative of medias content. As illustrated in FIG. 8, the method may also comprise, in addition to the steps 54 and 56 illustrated in FIG. 7, retrieving medias content, step 60, from at least one of the media library, analyzing the medias content, step 62, and generating corresponding parameters, step 64, indicative of the at least one medias content using a Digital Signal Processing (DSP) technique to generate the corresponding parameters indicative of the at least one medias content. The method comprises analyzing at least some of the data, step 56, relative to users medias consumption in combination with at least some of the parameters indicative of medias content and generating 56 a second list of at least one media. The method also comprises selecting, step 58, based on the first and second lists of at least one media at least one media for recommendation. The method may also comprise a step of accessing to users settings, step 59, and using said users settings for modifying the first and second lists of at least one media.

Figure 9:
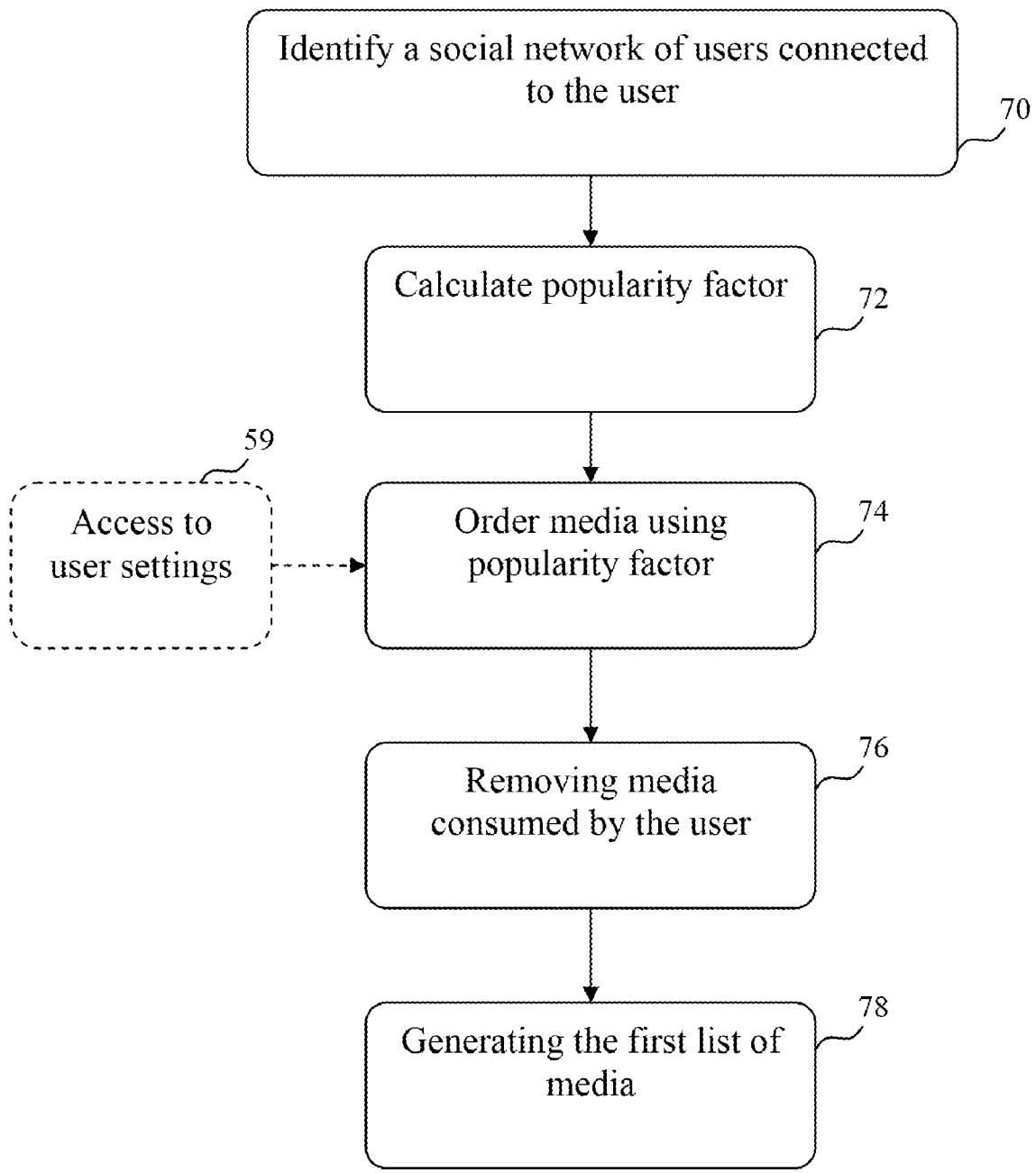

As illustrated in FIG. 9, the step of analyzing 52 of the method of the present invention may further comprise the steps of identifying a social network of users connected to the user, step 70, using the connections between users. The method may further comprise calculating a popularity factor, step 72, of medias consumed by the social network of users connected to the user, using the data relative to users medias consumption and ordering the medias consumed by the social network, step 74, using the popularity factor, thereby generating a list of ordered medias consumed. The method may comprise removing from the list of ordered medias, step 76, the medias consumed by the user and generating, step 78, the first list of at least one media. The users settings 59 may influence the step 74 of ordering, as a user may want to specify which type of ordering he prefers through the settings 59.

Figure 10:
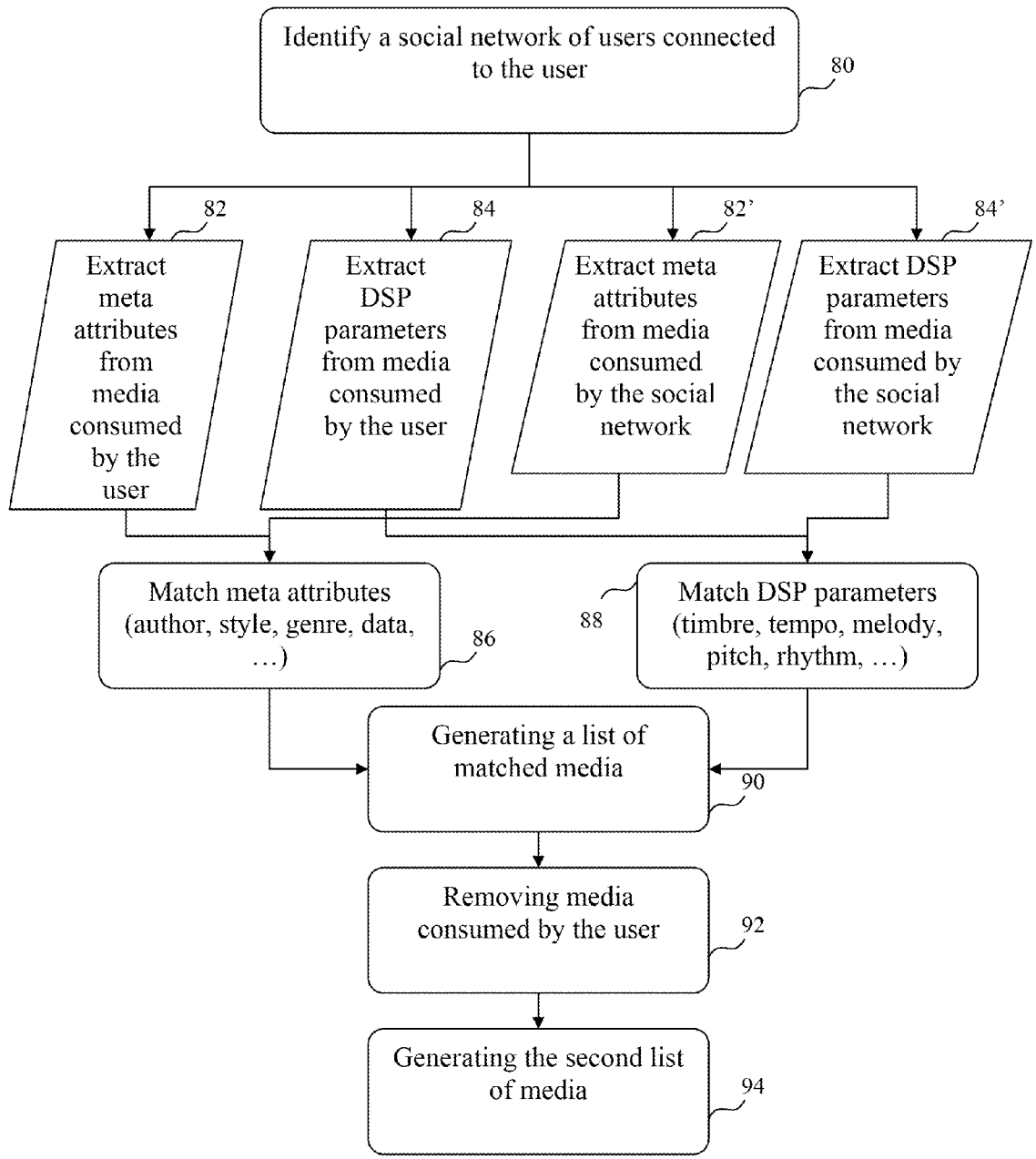

As illustrated in FIG. 10, the step of analyzing 56 of the method according to the invention may further comprises the steps of identifying a social network of users, step 80, connected to the user, using the connections between users. The method may further comprise extracting meta attributes, steps 82 and 82', from the data relative to users medias consumption for the user and for the social network and matching the meta attributes, step 86, of the user with the meta attributes of the social network thereby obtaining a list of matched meta attributes. The method may also comprise extracting parameters indicative of medias content, step 84 and 84', relative to users consumption for the user and for the social network and matching the parameters indicative of medias content, step 88, of the user with the parameters indicative of medias content of the social network, thereby obtaining a list of matched parameters indicative of medias content. The method may further comprise generating a list of matched medias, step 90, using the list of matched meta attributes and the list of matched parameters indicative of medias content and removing, step 92, from the list of matched medias the media consumed by the user and generating, step 94, the second list of at least one media.

Figure 11:
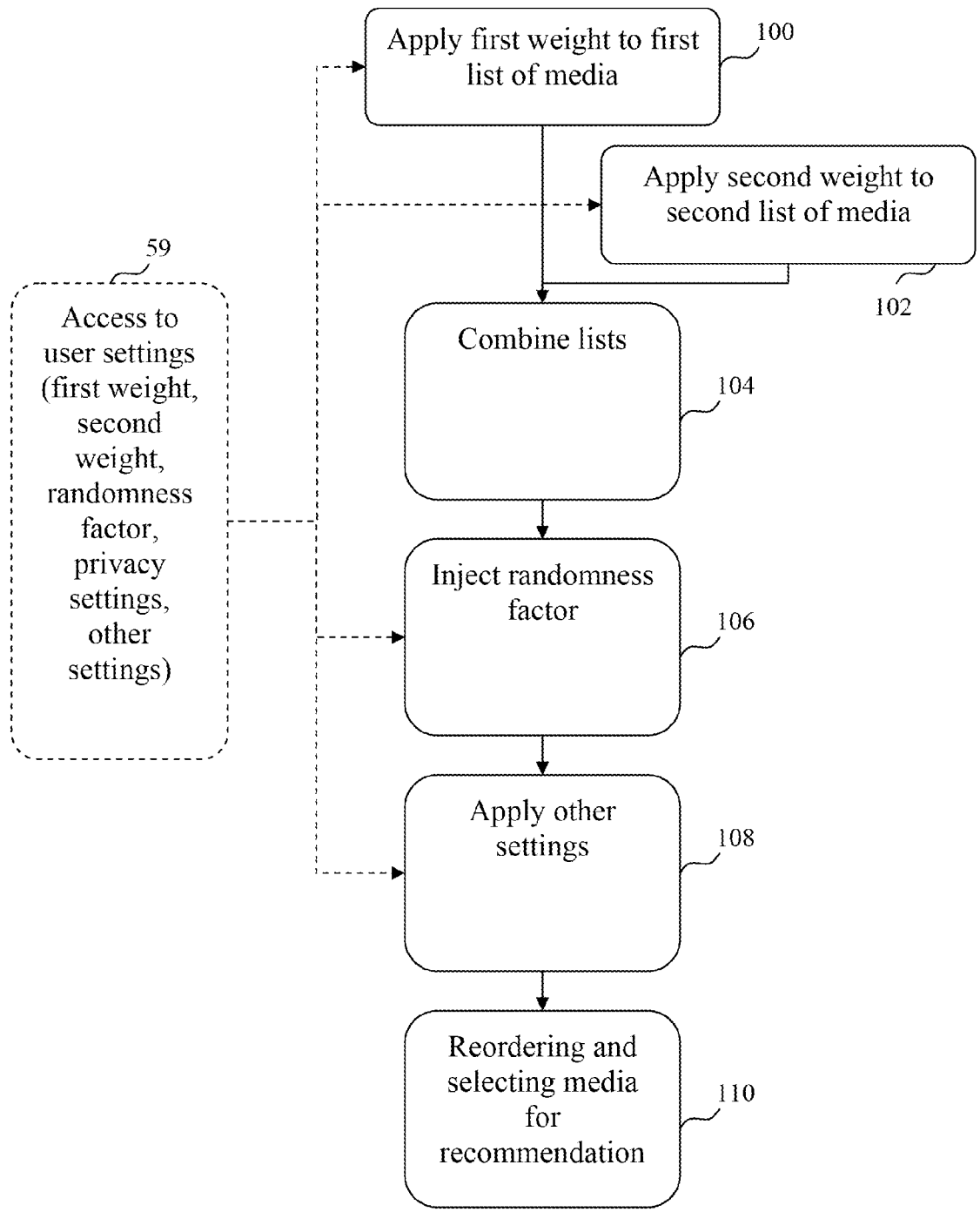

As illustrated in FIG. 11, the step of selecting 58 of the method according to the invention may further comprises the steps of applying a first weight to the first list of at least one media, step 100, applying a second weight to the second list of at least one media, step 102 and combining the first and second lists in a combined list, step 104, taking into account the weights. The method may also comprise injecting a randomness factor, step 106, to the combined list thereby adding supplemental random medias to the combined list and reordering. The method may comprise reordering the combined list according to other users specific settings, step 108, thereby selecting the at least one media for recommendation, step 110.

The client software 5, illustrated on FIG. 1, complements the server side of the system 1. This client software 5, may play a number of roles in the system 1, such as informing the users database 12 about the social network groups of the user, inform the users database 12 about the media consumption pattern of the user, allowing the user to modify the user settings 22 utilized by the recommendation engine 20 and provide or displays to the user the media recommendations generated by the device 10.

The client software 5 is thus active both at the beginning and at the end of the media recommendation process. It may be used for providing input to the device 10, by tracking the usage pattern of the user and by allowing the user to modify the user settings used by the recommendation engine 20. It is also responsible for providing the results of the media recommendations back to the user. The client software 5 may further inform the users database 12 about the social network groups of the user. The client software 5 may be responsible for informing the users database of the contacts of the user. The client software 5 may also allow the user to initiate a "friend request", that is, a request for one of his contacts to join a social network group. A user may build a multitude of independent but possibly overlapping social network groups. The client software may also receive the answers about these requests from the server.

In the case where the client software 5 is a media playing device used is a mobile phone, the contacts used for building a social network for the user may be the contacts already available in the mobile phone address book. In the case where the media playing device is not a mobile phone, or is not a device that has a default or built-in contact database, then the user may need to manually populate the contact entries that he wishes to invite to his social network groups.

In both cases where the client software 5 is a mobile phone or not, the client software may also allow the option of importing contacts information from popular social-networking platforms, such as Facebook®, Twitter®, etc., or from any other application that contains contact information, such as email accounts like Gmail® or Hotmail® for example. Furthermore, for online social-networking platforms that provide an open set Application Programming Interface (API), again for example Facebook® and Twitter®, a software system on the server side, more precisely, a functionality in the device 10 of the users database and media library 13, may provide a synchronizing functionality between the contact set of the device 10 and that of the targeted online social-networking platform. In the case of the media playing device being a mobile phone, the built-in telephone contact database e.g. the internal phonebook of the mobile phone, could be enhanced by the client software to indicate to which social network groups each of these contacts belong.

In the case where the client device is a media playing device not being a mobile phone, the client software may provide a Graphical User Interface (GUI) that would indicate the contacts of the user and the social network groups they are in. Furthermore, the client software may allow modifying all social network information, such as, but not limited to, removing a contact from a group, changing the name of a group or deleting a group. Any number of communication protocols, such as for example Session Initiation Protocol (SIP) or Hypertext Transfer Protocol (HTTP), could be used for communicating all necessary messages, such as the friend requests, between the client software 5 and the device 10. If the SIP protocol is used, the "friend request" functionality may be implemented using the SUBSCRIBE/NOTIFY mechanism. A user agent e.g. a media playing device that wishes to add a contact as a friend may send a SUBSCRIBE message to the server. The users database and media library 13 of the server side may service this request, by sending a new SUBSCRIBE message to the user agent of the contact which is on the terminating side of the friend request. The contact may respond back to the server system with a NOTIFY message indicating if he/she accepts or declines the friend request. Finally the server may forward this NOTIFY message to the originating user agent, notifying him/her if the friend request was accepted.

The client software 5 may also be used to inform the users database 12 about the media consumption pattern of the user. The information about the usage pattern may include, but is not limited to, the name, performer and any other tags, meta data and other attributes available for the media. For example, in the case of music media, this information could include composer name, performer name, album name, music genre, etc. Furthermore, data such as if the media was downloaded for free, purchased or retrieved from a personal collection may be considered as usage pattern information. Each time a media file is consumed by the user or by his media player device, the client software may communicate the event to the users database 12 such that the media consumption is recorded in the usage history of the user. This information could also be communicated in batches when requested or at predetermined time intervals.

If the media library 14 does not yet have a record of the media file being consumed by the user, a digital copy of the media file may be automatically transferred from the client software to the server side, where the media file may be analyzed and recorded in the media library 14. Again, any number of communication protocols, such as for example SIP or HTTP, could be used for communicating all necessary messages, such as a media consumption event, between the client software and the server system. Furthermore, if the SIP protocol is used, a NOTIFY message could be used by the client software 5 to notify the device 10 that a certain media file was consumed.

The client software 5 may allow the user to modify the user settings 22 utilized by the recommendation engine 20. The client software 5 may provide a GUI by which the user may be able to visualize all the system's user settings and modify these user settings 22. A set of such settings was described previously. Again, any number of communication protocols, such as for example SIP or HTTP, may be used for communicating all necessary messages between the client software 5 and the device 10.

The client software 5 may further provide and/or display the media recommendations generated from the device 10, to the user. The client software may be responsible for communicating to the media playing device of the user the media recommendations. The recommendations may either be done automatically by the system in a "push" approach or the user could request for a recommendation to be done in a "pull" approach. Both "pull" and "push" approaches could co-exist in the same implementation of the system, and their functioning could be controlled by the user through a user setting. These functionalities could be integrated to a media player software available on the media player device such as iTunes® or Media Player® which could provide the user with links to suggested medias. These functionalities could also be implemented as a stand-alone application which could have its own GUI implemented independently of any media playing software available on the media player device. Again, any number of communication protocols, such as for example SIP or HTTP, could be used for communicating the media recommendation messages between the client software 5 and the device 10.

As for the download of suggested media, the client software 5 may have a set of pre-defined default sources for the media files. The user may also have the option of adding, removing and changing the media sources. These sources may include any legal source of the media, such as the iTunes Store®, Nokia's Music Store®, Amazon® or other online media stores and sources. As a potential source of revenues, purchases carried-on because of recommendations provided by the system could lead to commission earning from these established online media stores. Another embodiment of the system could directly carry a catalogue of media for sale, and provide the option for the user to purchase the media directly from the system when a recommendation is made.

The media downloads could also be done independently of the client software 5 and could be managed by the default downloading scheme of the media player device. Furthermore, if the SIP protocol is used, a NOTIFY message could be used by the device 10 to notify the client software of a certain media file recommendation to be made to the end user.

The invention has been described with reference to a particular embodiment. However, it will be readily apparent to those skilled in the art that it is possible to embody the invention in specific forms other than those of the embodiment described above. The described embodiment is merely illustrative and should not be considered restrictive in any way. The scope of the invention is given by the appended claims, rather than the preceding description, and all variations and equivalents that fall within the range of the claims are intended to be embraced therein.

The invention claimed is:

1. A device for selecting at least one media for recommendation to a user, comprising:
   a processor coupled to a memory;
   an interface to a user database comprising data related to users media consumption and data related to connections between users;
   a statistical analyzer for receiving at least some of the data related to users media consumption and at least some of the data related to connections between users as inputs and for generating a first list of media for output;
   an interface to a media library comprising parameters indicative of media content;
   an analytical analyzer for receiving at least some of the data related to users media consumption and at least some of the parameters indicative of media content as inputs and for generating a second list media for output; and
   a recommendation engine for receiving the first and second lists of media as inputs, applying a first weight to the first list, applying a second weight to the second list, combining the first and second lists into a combined list taking into account the first and second weights, adding supplemental random media to the combined list, reordering the combined list according to other users specific settings, and selecting at least one media for recommendation to the user for output.

2. The device of claim 1, wherein the user database and the media library are comprised in the same entity.

3. The device of claim 1, wherein the media library comprises media content.

4. The device of claim 3 further comprising a content analyzer for receiving at least one of the media content as input and for generating corresponding parameters indicative of the at least one media content for output.

5. The device of claim 4, wherein the content analyzer is comprised within the analytical analyzer and uses a Digital Signal Processing (DSP) technique to generate the corresponding parameters indicative of the at least one media content.

6. The device of claim 1, further comprising an interface to user settings, said user settings being used for modifying behaviours of at least one of the statistical analyzer, the analytical analyzer and the recommendation engine.

7. A method, executed in a server, for selecting at least one media for recommendation to a user, comprising the steps of:
   a) accessing a user database to retrieve data related to media consumption of a plurality of users and data related to connections between the plurality of users;
   b) in accordance with analyzing the data related to media consumption of the plurality of users in combination with the data related to connections between the plurality of users, generating a first list of media;
   c) accessing a media library to retrieve parameters indicative of media content;
   d) in accordance with analyzing the data related to media consumption of the plurality of users in combination with the parameters indicative of media content, generating a second list of media;
   e) applying a first weight to the first list of media and a second weight to the second list of media, to create weighted first and second lists of media;
   f) combining the weighted first and second lists of media into a combined list;
   g) adding supplemental random media to the combined list thereby injecting a randomness factor to the combined list;
   h) reordering the combined list in accordance with user settings; and
   i) selecting from the combined list at least one media for recommendation to the user.

8. The method of claim 7, further comprising, before step d), the steps of:
   i) retrieving media content from the media library;
   ii) analyzing the media content; and
   iii) generating new corresponding parameters indicative of the media content.

9. The method of claim 8, wherein the step ii) of analyzing comprises using a Digital Signal Processing (DSP) technique to generate the corresponding parameters indicative of the media content.

10. The method of claim 7, further comprising a step of accessing user settings, and using said user settings for modifying at least one of the steps of generating a first list of media, generating a second list of media and selecting from the combined list at least one media for recommendation to the user.

11. The method of claim 7, wherein step b) further comprises the steps of:
   i) identifying a social network of users connected to the user, using the data related to connections between the plurality of users;
   ii) calculating a popularity factor of media consumed by the social network of users connected to the user, using the data related to media consumption of the plurality of users;
   iii) ordering the media consumed by the social network, using the popularity factor, thereby generating an ordered list of media consumed;
   iv) removing from the ordered list of media consumed, the media consumed by the user; and
   v) generating the first list of media.

12. The method of claim 7, wherein step d) further comprises the steps of:
   i) identifying a social network of users, connected to the user, using the data related to connections between the plurality of users;
   ii) extracting meta attributes from the data related to media consumption for the user and for the social network;
   iii) matching the meta attributes of the user with the meta attributes of the social network thereby obtaining a list of matched meta attributes;
   iv) extracting parameters indicative of media content related to media consumption for the user and for the social network;
   v) matching the parameters indicative of media content of the user with the parameters indicative of media content of the social network, thereby obtaining a list of matched parameters indicative of media content;
   vi) generating a list of matched media using the list of matched meta attributes and the list of matched parameters indicative of media content;
   vii) removing, from the list of matched media, the media consumed by the user; and
   viii) generating the second list of media.

13. The method of claim 12, wherein the media contains music and the meta attributes comprise author attributes; style attributes; genre attributes; and date attributes.

14. The method of claim 12, wherein the parameters indicative of media content comprise a timbre; a tempo; a melody; a pitch; and a rhythm.

15. The method of claim 7, wherein the user settings comprise the first weight; the second weight; a randomness factor; and a preferred type of ordering.

16. A method for recommending a media file to a first user, comprising the steps of:
   generating a first list of media files including media files consumed by a plurality of users connected to the first user;
   generating a second list of media files including media files consumed by the plurality of users connected to the first user having parameters that match parameters of media files consumed by the first user;
   applying a first weight to the first list and a second weight to the second list;
   combining the weighted first and second lists into a combined list;
   adding at least one random media file to the combined list;
   reordering the combined list in accordance with a user setting; and
   selecting a media file from the combined list for recommendation to the first user.

17. The method of claim 16, wherein the first user and the plurality of users are connected via a social network.

18. The method of claim 16, further comprising the step of ordering the first list of media files in accordance with a popularity factor associated with the media files consumed by the plurality of users connected to the first user.

19. The method of claim 16, further comprising the steps of:
   extracting meta attributes from the media files consumed by the first user and the plurality of users connected to the first user; and
   generating the second list of media files in accordance with matching the meta attributes of the media files consumed by the first user with the meta attributes of the media files consumed by the plurality of users connected to the first user.

20. The method of claim 16, further comprising the step of removing the media files consumed by the first user from at least one of the first list of media files, the second list of media files, or the combined list.

* * * * *